(12) United States Patent
Kim et al.

(10) Patent No.: US 10,088,708 B2
(45) Date of Patent: Oct. 2, 2018

(54) LIQUID CRYSTAL DISPLAY DEVICE AND MANUFACTURING METHOD THEREOF

(71) Applicant: Samsung Display Co. Ltd., Yongin-si (KR)

(72) Inventors: Tae Min Kim, Hwaseong-si (KR); Jin Won Kim, Suwon-si (KR); Sung Jae Yun, Hwaseong-si (KR); Taek Joon Lee, Hwaseong-si (KR); Sun Kyu Joo, Suwon-si (KR)

(73) Assignee: SAMSUNG DISPLAY CO. LTD., Gyeonggi-Do (KR)

(*) Notice: Subject to any disclaimer, the term of this patent is extended or adjusted under 35 U.S.C. 154(b) by 168 days.

(21) Appl. No.: 15/197,880

(22) Filed: Jun. 30, 2016

(65) Prior Publication Data
US 2017/0199431 A1    Jul. 13, 2017

(30) Foreign Application Priority Data

Jan. 8, 2016 (KR) .................. 10-2016-0002802

(51) Int. Cl.
*G02F 1/1335* (2006.01)
*G02F 1/1339* (2006.01)
*G02F 1/1333* (2006.01)
*G02F 1/1337* (2006.01)

(52) U.S. Cl.
CPC ...... *G02F 1/133723* (2013.01); *G02F 1/1339* (2013.01); *G02F 1/133345* (2013.01); *G02F 1/133512* (2013.01); *G02F 1/133514* (2013.01); *G02F 1/133516* (2013.01); *G02F 2001/133388* (2013.01); *G02F 2001/133776* (2013.01)

(58) Field of Classification Search
CPC ............ G02F 1/1339; G02F 1/13394; G02F 2001/13398; G02F 2001/13396; G02F 1/133345; G02F 2001/133776; G02F 2001/133388; G02F 1/136209; G02F 1/133512; G02F 2001/136222; G02F 1/133514
See application file for complete search history.

(56) References Cited

U.S. PATENT DOCUMENTS

| 9,268,167 | B2* | 2/2016 | Tseng | G02F 1/133512 |
| 9,885,917 | B2* | 2/2018 | Lee | G02F 1/133723 |
| 2010/0079710 | A1* | 4/2010 | Yang | G02F 1/13392 |
| | | | | 349/106 |
| 2011/0013125 | A1* | 1/2011 | Lee | G02F 1/133711 |
| | | | | 349/106 |
| 2015/0160486 | A1* | 6/2015 | Wu | G02F 1/1339 |
| | | | | 349/153 |

FOREIGN PATENT DOCUMENTS

| KR | 101096687 | 12/2011 |
| KR | 1020160087042 | 7/2016 |

* cited by examiner

*Primary Examiner* — Jia Pan
(74) *Attorney, Agent, or Firm* — Cantor Colburn LLP

(57) ABSTRACT

A liquid crystal display device includes first substrate including a display area in which a plurality of pixels are disposed and a non-display area which surrounds the display area, and a light-shielding member disposed on the first substrate, the light-shielding member disposed on boundaries between the plurality of pixels and on the entire non-display area and defining an alignment layer dam pattern, which is in the shape of a recess, in the non-display area, where the alignment layer dam pattern surrounds the display area and has step-type height differences on a side of the display area.

15 Claims, 12 Drawing Sheets

LIQUID CRYSTAL DISPLAY DEVICE AND MANUFACTURING METHOD THEREOF

This application claims priority to Korean Patent Application No. 10-2016-0002802, filed on Jan. 8, 2016, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device and a manufacturing method thereof.

2. Description of the Related Art

A liquid crystal display ("LCD") device displays an image by injecting a liquid crystal material between two substrates which face each other, and applies a voltage to the liquid crystal material so as to change a molecular arrangement of the liquid crystal material. Since it is difficult to obtain a uniform molecular arrangement of the liquid crystal material simply by injecting the liquid crystal material between the two substrates, an alignment film aligns the liquid crystal material in a particular direction. Polyimide ("PI") is generally used to form the alignment layer, and has advantages in that it reduces a reflection of a transparent electrode and improves withstand-direct current ("DC") characteristics while stabilizing the alignment of liquid crystal molecules. The alignment layer is formed by preparing a PI solution, applying the PI solution to a display area of a substrate through inkjet printing, and drying the PI solution. The PI solution vaporizes first at an edge area of the display area where the attraction between the molecules is relatively weak compared to a middle area of the display area.

SUMMARY

Since a PI solution is dried first at an edge area of a display area, discoloration stains are generated due to regional differences in a degree of drying of the polyimide ("PI") solution.

Exemplary embodiments of the invention provide a liquid crystal display ("LCD") device including an alignment layer dam pattern which stores an alignment layer composition in a light-shielding member so as to compensate for a speed of drying of the alignment layer composition at the edge of a display area and thus to form an alignment layer having a uniform thickness throughout the display area.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention an LCD device that includes a first substrate including a display area in which a plurality of pixels are disposed and a non-display area which surrounds the display area, and a light-shielding member formed on the first substrate, the light-shielding member disposed on boundaries between the plurality of pixels and on the entire non-display area and defining an alignment layer dam pattern, which is in the shape of a recess, in the non-display area, where the alignment layer dam pattern surrounds the display area and has step-type height differences on a side of the display area.

In an exemplary embodiment, an alignment layer may dispose on the entire display area and on the alignment layer dam pattern in the non-display area, where the alignment layer has a uniform thickness throughout the entire display area.

In an exemplary embodiment, a surface height of the light-shielding member that define the alignment layer dam pattern may change from a first height to a second height, which is lower than the first height, to a third height, which is lower than the second height, to a fourth height, which is higher than the first height, in an outward direction from the display area.

In an exemplary embodiment, an alignment layer dam pattern may have dam-type height differences, which are larger than the step-type height differences on the side of the display area, on an outer side of the non-display area.

In an exemplary embodiment, a second substrate may be spaced apart from the first substrate and facing the first substrate, and a sealing member disposed in the non-display area, the sealing member interposed between the first substrate and the second substrate to bond the first substrate and the second substrate together, where the alignment layer dam pattern is disposed on an inner side of the sealing member.

In an exemplary embodiment, the plurality of color filters may disposed between the first substrate and the light-shielding member and provided for the plurality of pixels, respectively, and a plurality of dummy color filters disposed in the non-display area, where the alignment layer dam pattern is defined by a shape of the surface of the light-shielding member on the dummy color filters.

In an exemplary embodiment, the plurality of color filters may include first, second, and third color filters, which are alternately disposed on the display area and display different colors, a thickness of the third color filter is larger than thicknesses of the first and second color filters.

In an exemplary embodiment, the plurality of dummy color filters may include a first dummy color filter, which is disposed adjacent to the display area and a second dummy color filter, which is disposed on an outer side of the first dummy color filter and is spaced apart from the first dummy color filter, the first dummy color filter includes the same material as that of the third color filter, and the second dummy color filter includes the same material as that of one of the first and second color filters.

In an exemplary embodiment, the plurality of dummy color filters may further include a third dummy color filter, which is disposed on an outer side of the second dummy color filter and is spaced apart from the second dummy color filter, and the third dummy color filter includes the same material as that of one of the first, second, and third color filters.

In an exemplary embodiment, an interlayer dielectric layer may disposed between the light-shielding member and the color filters and between the light-shielding member and the dummy color filters, where the interlayer dielectric layer covers the display area and the non-display area and an opening, which partially exposes a space between the dummy color filters, is defined in the interlayer dielectric layer.

In an exemplary embodiment, an area in which the alignment layer dam pattern may be defined includes a plurality of sections having different heights, the plurality of sections include a first section in which the first dummy color filter is stacked on the first substrate, the interlayer dielectric layer is stacked on the first dummy color filter, and the light-shielding member is stacked on the interlayer dielectric layer, a second section in which the interlayer dielectric layer is stacked on the first substrate and the light-shielding member is stacked on the interlayer dielectric layer, a third section in which the light-shielding member is stacked directly on the first substrate, and a fourth section in which the second dummy color filter is stacked on the first substrate, the interlayer dielectric layer is stacked on the second dummy color filter, and the light-shielding member is stacked on the interlayer dielectric layer, and the first, second, third, and fourth sections are disposed adjacent to one another or in series along the outward direction from the display area.

In an exemplary embodiment, a thickness of the light-shielding member in the first section may be less than thicknesses of the light-shielding members in the second through fourth sections, respectively.

In another exemplary embodiment of the invention, there is provided a liquid device comprising a first substrate including a display area in which a plurality of pixels are disposed and a non-display area which surrounds the display area, a plurality of color filters disposed on the first substrate in the display area and provided for the plurality of pixels, respectively, first and second dummy color filters disposed on the non-display area of the first substrate, an interlayer dielectric layer which is disposed on the plurality of color filters and the first and second dummy color filters on the first substrate and in which a first opening, which partially exposes a space between the first and second dummy color filters, is defined, and a light-shielding member disposed on the interlayer dielectric layer, on boundaries between the plurality of pixels, and on the entire non-display area, where a surface height of the light-shielding member on and around a boundary between the display area and the non-display area changes from a first height to a second height, which is lower than the first height, to a third height, which is lower than the second height, to a fourth height, which is higher than the first height, in an outward direction from the display area.

In an exemplary embodiment, a third disposed on an outer side of the second dummy color filter and may spaced apart from the second dummy color filter, where a second opening, which exposes a space between the second and third dummy color filters, is defined in the interlayer dielectric layer.

In an exemplary embodiment, the non-display area may includes a plurality of sections, which have different heights and are disposed along the outward direction from the display area, the plurality of sections include a first section in which the first dummy color filter is stacked on the first substrate, the interlayer dielectric layer is stacked on the first dummy color filter, and the light-shielding member is stacked on the interlayer dielectric layer, a second section in which the interlayer dielectric layer is stacked on the first substrate and the light-shielding member is stacked on the interlayer dielectric layer, a third section in which the light-shielding member is stacked directly on the first substrate, and a fourth section in which the second dummy color filter is stacked on the first substrate, the interlayer dielectric layer is stacked on the second dummy color filter, and the light-shielding member is stacked on the interlayer dielectric layer, and the first, second, third, and fourth sections are disposed adjacent to one another or in series along an outward direction from the first substrate.

In an exemplary embodiment, the light-shielding member may have a second thickness on the boundaries between the plurality of color filters in the display area and in the first section of the non-display area and has a first thickness, which is larger than the second thickness, on the entire non-display area except for the first section, and a height from the surface of the light-shielding member from the first substrate is the first height in the first section and is a fourth height in the fourth section, the fourth height higher than the first height.

In an exemplary embodiment, an alignment layer may be disposed on the entire display area and on the first through fourth sections of the non-display area, where the alignment layer has a uniform thickness throughout the entire display area.

According to an exemplary embodiment of the invention A manufacturing method of an LCD device comprising preparing a first substrate including a display area and a non-display area, which surrounds the display area, forming a first color filter on the display area of the first substrate, forming a second color filter on the display area of the first substrate on which the first color filter is formed and forming a second dummy color filter on the non-display area, forming a third color filter on the display area of the first substrate on which the first and second color filters and the second dummy color filter are formed and forming a first dummy color filter on the non-display area, forming an interlayer dielectric layer in which an opening, which partially exposes a space between the first and second dummy color filters, is defined on the entire surface of the first substrate on which the first, second, and third color filters and the first and second dummy color filters are formed, applying a light-shielding material on the entire surface of the first substrate on which the interlayer dielectric layer is formed, and forming a light-shielding member among the first, second, and third color filters in the display area and on an entirety of the non-display area by patterning the light-shielding material, the light-shielding member defining an alignment layer dam pattern, which is a recess, in the non-display area.

In an exemplary embodiment, after the forming the light-shielding member, applying an alignment layer composition on the inside of the alignment layer dam pattern and on the entire display area, and forming an alignment layer having a uniform thickness throughout the display area by compensating for a drying speed of the alignment layer composition at the edge of the display area with the alignment layer composition stored in the alignment layer dam pattern.

In an exemplary embodiment, comprises performing an exposure process using a photomask including a first light-transmitting area, which transmits light therethrough in a first tone, a second light-transmitting area, which transmits light therethrough in a second tone, and a light-shielding area, which does not transmit light therethrough.

In an exemplary embodiment, the performing the exposure process using the photomask, comprises performing the exposure process by placing the photomask such that the light-shielding area corresponds to tops of the first, second, and third color filters, the second light-transmitting area corresponds to spaces among the first, second, and third color filters and a top of the first dummy color filter, and the first light-transmitting area corresponds to the entire non-display area except for the top of the first dummy color filter.

According to the exemplary embodiments, regional differences in the speed of drying of an alignment layer composition applied to a display area may be compensated for by storing the alignment layer composition in an alignment layer dam pattern.

In addition, deviations in the thickness of an alignment layer may be improved.

Therefore, discoloration stains that may be formed as the alignment layer composition is dried may be improved.

Moreover, since the alignment layer dam pattern is provided between the display area and a sealing member and performs the functions of a dam, the alignment layer composition applied to the display area may be prevented from spilling over to the sealing member.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
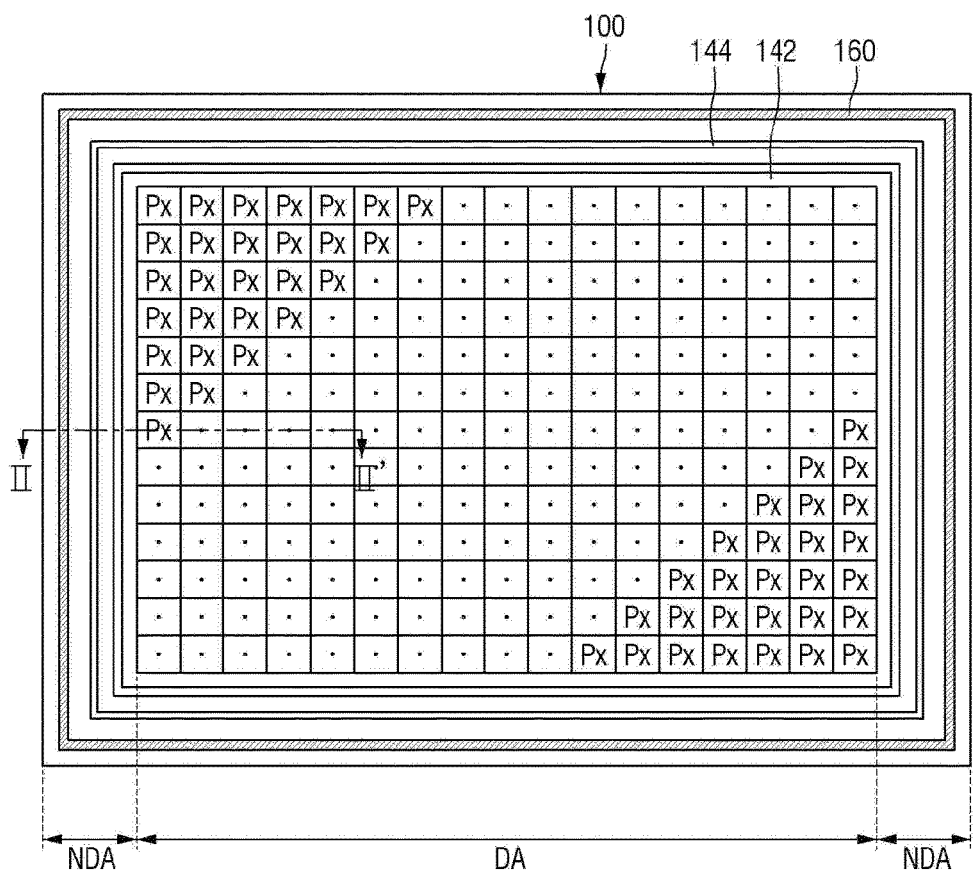
FIG. 1 is a plan view of an exemplary embodiment of a liquid crystal display ("LCD") device according to the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on" another element or layer, it can be directly on the other element or layer or intervening elements or layers may be present. Like numbers refer to like elements throughout.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the invention.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

In the specification, a light emitting device refers to a device providing light and for example, may include a lighting device or a display device such as an organic light-emitting diode display device, an inorganic light-emitting diode display device, a plasma display device or the like, displaying a screen using light.

Exemplary embodiments of the invention will hereinafter be described with reference to the accompanying drawings.

The elements of a liquid crystal display ("LCD") device according to an exemplary embodiment of the invention will hereinafter be described.

Figure 2:
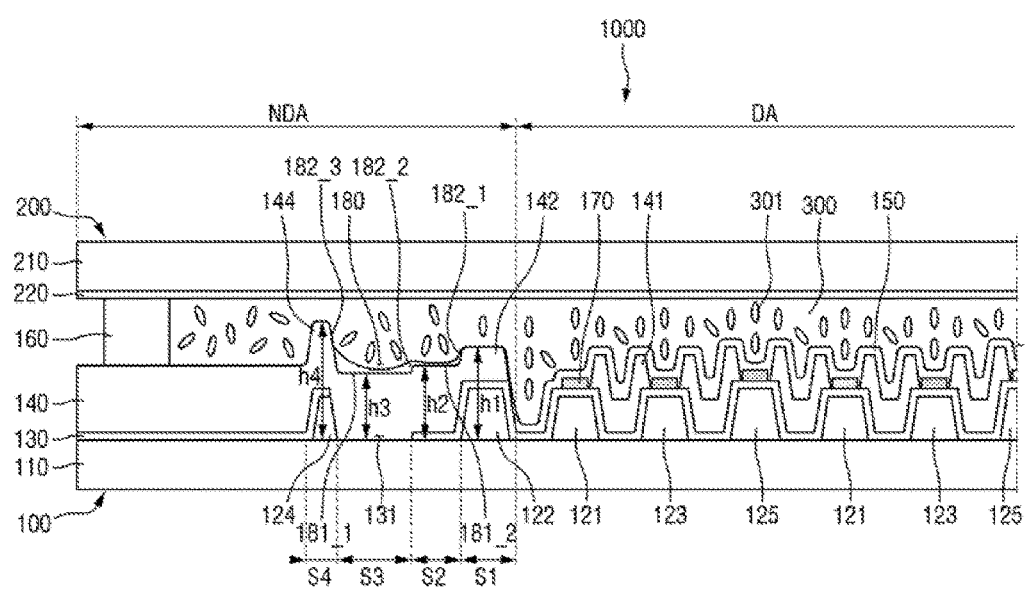
FIG. 2 is a cross-sectional view taken along line II-II' of FIG. 1.

FIG. 1 is a plan view of an LCD device according to an exemplary embodiment of the invention. FIG. 2 is a cross-sectional view taken along line II-II' of FIG. 1.

Referring to FIGS. 1 and 2, an LCD device 1000 includes a display area DA and a non-display area NDA, which surrounds the display area DA.

The display area DA is located at the center of the LCD device 1000 and displays an image. In an exemplary embodiment, the display area DA may be rectangular, for example, but the invention is not limited thereto. In an exemplary embodiment, the display area DA may be circular or may be in the form of a closed curve as in an automotive display, for example.

A plurality of pixels PX is disposed in the display area DA. The pixels PX may be arranged in a matrix form. Each of the pixels PX includes a color filter. A light-shielding member 140 is disposed along the boundaries between the pixels PX. The light-shielding member 140 may extend into the non-display area NDA. That is, the light-shielding member 140 may be disposed along the boundaries between the pixels PX in the display area DA and may cover the entire non-display area NDA.

The non-display area NDA is disposed in the periphery of the display area DA. The non-display area NDA may completely surround the display area DA.

A sealing member 160 is disposed on an outer side of the non-display area NDA. The sealing member 160 is interposed between a first display panel 100 and a second display panel 200, bonds the first display panel 100 and the second display panel 200 together, and seals the space between the first display panel 100 and the second display panel 200.

An alignment layer dam pattern 180 is disposed along the boundary between the display area DA and the non-display area NDA. That is, the alignment layer dam pattern 180 may be disposed on a further inner side of the LCD device 1000 than the sealing member 160.

The alignment layer dam pattern 180 may be obtained by adjusting the surface height of the light-shielding member 140 to differ from one region to another region. The alignment layer dam pattern 180 prevents an alignment layer 150 from spilling over to an outer side of the non-display area NDA to contact the sealing member 160 and at the same time, makes the thickness of the alignment layer 150 in the display area DA uniform. The alignment layer dam pattern 180 will be described later in detail.

The cross-sectional structure of the LCD device 1000 will hereinafter be described. As illustrated in FIG. 2, the LCD device 1000 includes the first display panel 100 and the second display panel 200, which face each other, and a liquid crystal layer 300, which is interposed between the first display panel 100 and the second display panel 200.

The first display panel 100 has a first substrate 110 as a base substrate. In an exemplary embodiment, the first substrate 110 may be provided as a transparent insulating substrate including glass or a transparent plastic material, for example.

Color filters are disposed on the display area DA of the first substrate 110 and are provided for the pixels PX, respectively. In an exemplary embodiment, the color filters include red color filters 121, green color filters 123, and blue color filters 125, for example. However, the invention is not limited thereto, and color filters may include various other colors. The red color filters 121, the green color filters 123, and the blue color filters 125 may be alternately arranged on the first substrate 110 in the display area DA. The red color filters 121, the green color filters 123, and the blue color filters 125 may have different thicknesses (or heights). FIG. 2 illustrates an example in which the red color filters 121 and the green color filters 123 have the same thickness (or height) in a direction perpendicular a direction along which the first substrate 110 extends, and the blue color filters 125 are thicker than the red color filters 121 and the green color filters 123, but the invention is not limited thereto.

A plurality of dummy color filters 122 and 124 may be disposed on the non-display area NDA of the first substrate 110. The dummy color filters 122 and 124 may include the same material as that of the color filters 121, 123, and 125 that are disposed in the display area DA. In an exemplary embodiment, the dummy color filters 122 and 124 and the color filters 121, 123, and 125 may be provided at the same time by the same process.

The dummy color filters 122 and 124 may be disposed on the non-display area NDA of the first substrate 110. The dummy color filters 122 and 124 may be disposed in an area between the boundary between the non-display area NDA and the display area DA and the outer side of the non-display area NDA. In an exemplary embodiment, the dummy color filters 122 and 124 in the non-display area NDA may include a first dummy color filter 122, which is disposed along the boundary between the display area DA and the non-display area NDA, and a second dummy color filter 124, which is disposed between the first dummy color filter 122 and the sealing member 160. FIG. 2 illustrates an example in which the first dummy color filter 122 is disposed along the circumference of the display area DA to surround the display area DA and the second dummy color filter 124 is disposed along the circumference of the first dummy color filter 122. The first dummy color filter 122 and the second dummy color filter 124 may both have a linear shape forming a closed curve.

The distance between the first dummy color filter 122 and the second dummy color filter 124 may be larger than the gap between a pair of adjacent color filters 121, 123, and 125 in the display area DA. The presence of the dummy color filters 122 and 124 may change the surface height of the light-shielding member 140 and may thus contribute to the formation of the alignment layer dam pattern 180.

The first dummy color filter 122 and the second dummy color filter 124 may include photosensitive organic materials including pigments of the same color or of different colors. More specifically, the first dummy color filter 122 may extend from one of the red color filters 121 that is disposed adjacent to the edge of the display area DA, or may be provided simultaneously with the red color filters 121, the green color filters 123, or the blue color filters 125 that are disposed in the display area DA. The second dummy color filter 124, which is spaced apart from the first dummy color filter 122, may be provided simultaneously with the red color filters 121 or the green color filters 123 that are disposed in the display area DA.

In an exemplary embodiment, the first dummy color filter 122 may include the same material as that of the blue color filters 125, and the second dummy color filter 124 may include the same material as that of the red color filters 121 or the green color filters 123. In a case in which the blue color filters 125 are thicker than the red color filters 121 or the green color filters 123, the first dummy color filter 122 may be thicker than the second dummy color filter 124. However, the invention is not limited thereto. That is, the combination of the colors of the first dummy color filter 122 and the second dummy color filter 124 is not particularly limited.

In an exemplary embodiment, the first dummy color filter 122 and the second dummy color filter 124 may have different widths in a direction parallel to a direction along which the first substrate 110 extends. More specifically, the first dummy color filter 122 may have a larger width than the second dummy color filter 124. However, the invention is not limited thereto. That is, the widths of the first dummy color filter 122 and the second dummy color filter 124 are not particularly limited.

An interlayer dielectric layer 130 is disposed on the color filters 121, 123, and 125 and the dummy color filters 122 and 124. The interlayer dielectric layer 130 may be an organic layer including an organic material, but an inorganic layer including an inorganic insulating material, a stack of an organic layer and an inorganic layer, or a hybrid layer including the combination of an organic material and an inorganic material may also be applicable to the interlayer dielectric layer 130.

The interlayer dielectric layer 130 covers most of the first substrate 110 in and across the display area DA and the non-display area NDA. The interlayer dielectric layer 130 may be conformally provided along the shape of the surface of the underlying structure including, for example, the color filters 121, 123, and 125, the dummy color filters 122 and 124, or the element (i.e., the first substrate 110 of FIG. 2) beneath the color filters 121, 123, and 125 and the dummy color filters 122 and 124, but the invention is not limited thereto.

An opening 131, which partially exposes the space between the first dummy color filter 122 and the second dummy color filter 124, is defined in the interlayer dielectric layer 130. The opening 131 does not expose the first dummy color filter 122, which is disposed on a relatively inner side of the non-display area NDA close to the display area DA, but may partially expose the second dummy color filter 124, which is disposed on a relatively outer side of the non-display area NDA. More specifically, the interlayer dielectric layer 130 begins to extend from the display area DA to the non-display area NDA to completely cover the first dummy color filter 122, and extends further toward the second dummy color filter 124, but stops extending at a location on the first substrate 110 between the first dummy color filter 122 and the second dummy color filter 124 before reaching the second dummy color filter 124. Then, the interlayer dielectric layer 130 resumes extending from the top surface of the second dummy color filter 124 to cover the outer sidewall of the second dummy color filter 124, and continues to extend toward the outer side of the non-display area NDA.

Due to the aforementioned structure of the LCD device 1000, a plurality of sections having different combinations of the dummy color filters 122 and 124 and the interlayer dielectric layer 130 stacked therein and thus having different heights are defined on the first substrate 110. The plurality of sections include a first section S1 in which the first dummy color filter 122 and the interlayer dielectric layer 130 are stacked on the first substrate 110, a second section S2 in which the interlayer dielectric layer 130 is stacked on the first substrate 110, a third section S3 in which the first substrate 110 is exposed without the interlayer dielectric layer 130 and the dummy color filters 122 and 124 stacked thereon, and a fourth section S4 in which the second dummy color filter 124 and the interlayer dielectric layer 130 are stacked on the first substrate 110. The first section S1, the second section S2, the third section S3, and the fourth section S4 may be disposed adjacent to one another or in series along an outward direction from the first substrate 110. The second section S2 and the first section S1 have a relatively small height difference with the third section S3, but the fourth section S4 has a relatively large "dam-type" height difference with the third section S3. FIG. 2 illustrates an example in which the third section S3 has a larger width than the second width S2, but the invention is not limited thereto.

The light-shielding member 140 is disposed on the interlayer dielectric layer 130. The light-shielding member 140 may be disposed in the display area DA along the boundaries between the pixels PX, i.e., the boundaries between the color filters 121, 123, and 125. Hereinafter, the light-shielding member 140 in the display area DA may be also referred to as light-shielding member 141 for convenience. The light-shielding member 140 may be disposed in the non-display area NDA to cover the entire non-display area NDA. In an exemplary embodiment, the light-shielding member 140 may comprise a black organic polymer material including a black dye or pigment, for example. In an exemplary embodiment, the light-shielding member 140 may comprise a photosensitive material, for example.

The shape of the surface of the light-shielding member 140 may conform to the shape of the underlying structure. That is, the light-shielding member 140 alleviates the height differences in the underlying structure. However, since the light-shielding member 140 has different thicknesses in different areas, the light-shielding member 140 does not realize the same height differences as the underlying structure.

More specifically, the light-shielding member 140 may be divided into an area in which the light-shielding member 140 has a first thickness through full exposure and an area in which the light-shielding member 140 has a second thickness, which is less than the first thickness, through halftone exposure. In the display area DA, the light-shielding member 140 is disposed along the boundaries between the pixels PX and has the second thickness. In the non-display area NDA, the light-shielding generally has the first thickness except for the first section S1, which is adjacent to the boundary between the non-display area NDA and the display area DA. That is, in the first section S1, the light-shielding member 140 is disposed on the first dummy color filter 122 and has the second thickness.

Accordingly, the light-shielding member 140 has the second thickness in the first section S1 among other sections between the first dummy color filter 122 and the second dummy color filter 124, and has the first thickness, which is larger than the second thickness, in the second section S2, the third section S3, and the fourth section S4. However, the invention is not limited thereto. That is, the thicknesses of the light-shielding member 140 in the display area DA and the non-display area NDA, respectively, are not particularly limited. In an exemplary embodiment, in a case in which the light-shielding member 140 is provided as a column spacer, part of the light-shielding member 140 in the display area DA may have the first thickness.

In an exemplary embodiment, the difference between the first thickness and the second thickness may be larger than the difference between the thickness of the first dummy color filter 122 and the thickness of the second dummy color filter 124. Thus, a first height h1 from the surface of the first substrate 110 to the surface of a light-shielding member 142 in the first section S1 may be less than a fourth height h4 of a light-shielding member 144 in the fourth section S4. Also, in an exemplary embodiment, the sum of the thickness of the first dummy color filter 122, the thickness of the interlayer dielectric layer 130, and the second thickness of the light-shielding member 140 may be less than the sum of the thickness of the second dummy color filter 124, the thickness of the interlayer dielectric layer 130, and the first thickness of the light-shielding member 144. Thus, the first height h1 from the surface of the first substrate 110 to the surface of the light-shielding member 142 in the first section S1 may be less than the fourth height h4 of the light-shielding member 144 in the fourth section S4.

In conclusion, the height of the light-shielding member 140 relative to the surface of the first substrate 110 increases in the order of a third height h3 in the third section S3, a second height h2 in the second section S2, the first height h1 in the first section S1, and the fourth height h4 in the fourth section S4.

Accordingly, the alignment layer dam pattern 180, which is in the form of a recess whose surface height changes from the first height h1 to the second height h2 to the third height h3 to the fourth height h4 along a direction from the first dummy color filter 122 to the second dummy color filter 124, may be defined. The alignment layer dam pattern 180 stores an alignment layer composition 150a (refer to FIG. 10) for forming the alignment layer 150 and makes the thickness of the alignment layer 150 uniform throughout the entire display area DA by additionally supplying the alignment layer composition 150a to the edge of the display area DA where the alignment layer composition 150a is relatively quickly dried or by lowering the speed of drying the alignment layer composition 150a along the edge of the display area DA.

The alignment layer dam pattern 180 may surround the display area DA and may store and supply the alignment layer composition 150a. First and second bottom surfaces 181_1 and 181_2 and first through third sidewalls 182_1, 182_2, and 182_3 of the alignment layer dam pattern 180 may be provided by the surface of the light-shielding member 140. The first bottom surface 181_1 of the alignment layer dam pattern 180 may be the top surface of the light-shielding member 140 in the third section S3 in which the alignment layer dam pattern 180 has a lowest surface height, and the second bottom surface 181_2 may be the top surface of the light-shielding member 140 in the second section S2. The first sidewall 182_1 of the alignment layer dam pattern 180 may be a side of the light-shielding member 140 at the boundary between the first section S1 and the second section S2, the second sidewall 182_2 of the alignment layer dam pattern 180 may be a side of the light-shielding member 140 at the boundary between the second section S2 and the third section S3, and the third sidewall 182_3 of the alignment layer dam pattern 180 may be a side of the light-shielding member 140 at the boundary between the third section S3 and the fourth section S4.

The alignment layer dam pattern 180, similarly to the interlayer dielectric layer 130, may have small step-type height differences on an inner side of the LCD device 1000, but may have large dam-type height differences on an outer side of the LCD device 1000. The step-type height differences, which are provided near the boundary between the non-display area NDA and the display area DA, may alleviate the height difference between the non-display area NDA and the display area DA, and may serve as a passage for facilitating the spread of the alignment layer composition 150a stored in the alignment layer dam pattern 180 to the display area DA. The dam-type height differences, which are larger than the step-type height differences, may prevent the alignment layer composition 150a stored in the alignment layer dam pattern 180 from spilling out of the alignment layer dam pattern 180 and spreading to the sealing member 160.

Pixel electrodes 170 may be disposed on the interlayer dielectric layer 130 in the display area DA. The pixel electrodes 170 may be provided for the pixels PX, respectively. In an exemplary embodiment, the pixel electrodes 170 may include a transparent conductive material such as indium tin oxide ("ITO") or indium zinc oxide ("IZO"). The alignment layer 150 is disposed on the pixel electrodes 170.

The alignment layer 150 may be disposed on the entire display area DA and on the alignment layer dam pattern 180 in the non-display area NDA. The alignment layer 150 determines the orientation of the liquid crystal layer 300 and aligns the liquid crystal layer 300. In an exemplary embodiment, the alignment layer 150 may include polyimide, polyamic acid, polyamide, polyester, polyethylene, polyurethane or polystyrene, for example.

The alignment layer 150 may be conformally disposed on the surface of the underlying structure in the display area DA. The thickness of the alignment layer 150 may be uniform in the display area DA. That is, the thickness of the alignment layer 150 in the middle of the display area DA may be substantially the same as the thickness of the alignment layer 150 at the edge of the display area DA. In an exemplary embodiment, the thickness of the alignment layer 150 on the color filters 121, 123, and 125 may differ from the thickness of the alignment layer 150 on the light-shielding member 141 in the display area DA. In an exemplary embodiment, the thickness of the alignment layer 150 on the light-shielding member 141 in the display area DA may be less than the thickness of the alignment layer 150 on the color filters 121, 123, and 125, in which case, the thickness of the alignment layer 150 may still be substantially uniform on the color filters 121, 123, and 125, for example.

The alignment layer 150 may also be disposed on the alignment layer dam pattern 180 of the light-shielding member 140. In response to the alignment layer composition 150a stored in the alignment layer 150 being dried, the alignment layer 150 may be disposed on the alignment layer dam pattern 180. The thickness of the alignment layer 150 may be irregular in the alignment layer dam pattern 180.

More specifically, the thickness of the alignment layer 150 on the first bottom surface 181_1, which is between the second sidewall 182_2 and the third sidewall 182_3 of the alignment layer dam pattern 180, may increase closer to the second sidewall 182_2 and the third sidewall 182_3 and may decrease away from the second sidewall 182_2 and the third sidewall 182_3. Accordingly, the alignment layer 150 on the first bottom surface 181_1 may be provided between the second sidewall 182_2 and the third sidewall 182_3 in the form of a recess. The alignment layer 150 on the first bottom surface 181_1 may be thickest adjacent to the third sidewall 182_3 and may be thinnest in a central area between the second sidewall 182_2 and the third sidewall 182_3.

The thickness of the alignment layer 150 on the second bottom surface 181_2, which is between the first sidewall 182_1 and the second sidewall 182_2 of the alignment layer dam pattern 180, may increase closer to the first sidewall 182_1 and the second sidewall 182_2 and may decrease away from the first sidewall 182_1 and the second sidewall 182_2. Accordingly, the alignment layer 150 on the second bottom surface 181_2, like the alignment layer 150 on the first bottom surface 181_1, may be provided between the first sidewall 182_1 and the second sidewall 182_2 in the form of a recess. The alignment layer 150 on the second bottom surface 181_2 may be thickest adjacent to the first sidewall 182_1 and may be thinnest in a central area between the first sidewall 182_1 and the second sidewall 182_2.

The average thickness of the alignment layer 150 on the first bottom surface 181_1 may be larger than the average thickness of the alignment layer 150 on the second bottom surface 181_2.

FIG. 2 illustrates an example in which the alignment layer 150 covers the entire display area DA and is also provided in the non-display area NDA, but only on the inside of the alignment layer dam pattern 180, but the invention is not limited thereto. That is, the alignment layer 150 may also be disposed in the first section S1, i.e., on the top surface of the light-shielding member 142 on the first dummy color filter 122, in which case, the average thickness of the alignment layer 150 in the first section S1 may be less than the average thickness of the alignment layer 150 in the second section S2 or the third section S3.

The second display panel 200 will hereinafter be described. The second display panel 200 has a second substrate 210 as a base substrate. In an exemplary embodiment, the second substrate 210 may be provided as a transparent insulating substrate including glass or a transparent plastic material, for example.

A common electrode 220 may be disposed on the second substrate 210. The common electrode 220 may be provided as a transparent conductive layer. In an exemplary embodiment, the common electrode 220 may include a transparent conductive material such as ITO or IZO. The common electrode 220 may have a unitary body on the entire display area DA and the entire non-display area NDA.

The first display panel 100 and the second display panel 200 may face each other while maintaining a predetermined cell gap therebetween, and the liquid crystal layer 300 may be interposed between the first display panel 100 and the second display panel 200. FIG. 2 illustrates an example in which the alignment layer 150 is disposed only on the surface of the first display panel 100, but another alignment layer (not illustrated) may also be provided on the surface of the second display panel 200.

The liquid crystal layer 300 may be disposed on the inside of the sealing member 160, which is disposed in the non-display area NDA, and the alignment of liquid crystal molecules 301 in the liquid crystal layer 300 may vary depending on the presence and the thickness of the alignment layer 150. Since in the exemplary embodiment of FIG. 2, the alignment layer 150 is disposed in the alignment layer dam pattern 180 to have an irregular thickness and is not disposed outside the alignment layer dam pattern 180, it may be difficult to form the same alignment of liquid crystal molecules 301 as in the display area DA in the non-display area NDA. However, since the entire non-display area NDA is covered with the light-shielding member 140, problems such as light leakage may be prevented.

A manufacturing method of an LCD device, according to an exemplary embodiment of the invention, will hereinafter be described.

FIGS. 3 through 10 are cross-sectional views illustrating a manufacturing method of an LCD device, according to an exemplary embodiment of the invention.

Figure 3:
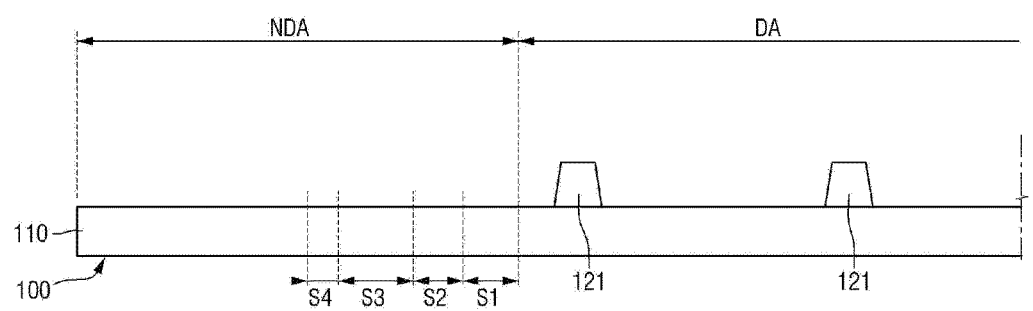
FIGS. 3 through 10 are cross-sectional views illustrating an exemplary embodiment of a manufacturing method of an LCD device, according to the invention.

Referring to FIG. 3, red color filters 121 are disposed on a display area DA of a first substrate 110. The red color filters 121 are patterned in the display area DA to be a predetermined distance from one another. In an exemplary embodiment, the red color filters 121 may be provided by photolithography or inkjet printing, for example, but the invention is not limited thereto.

Figure 4:
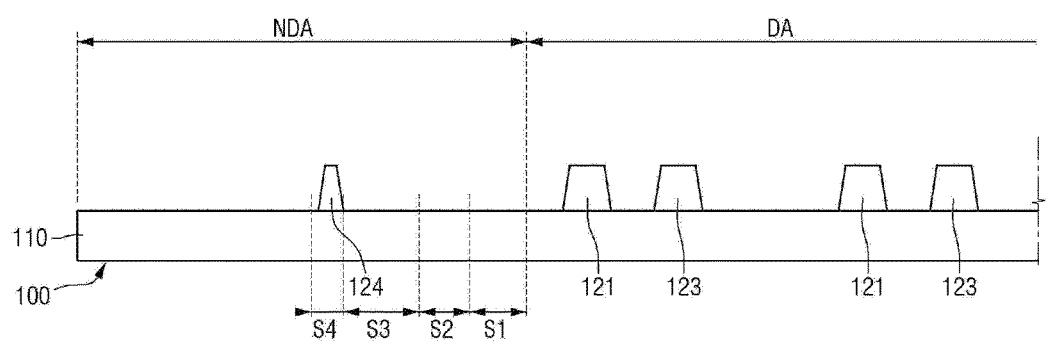

Referring to FIG. 4, green color filters 123 and a second dummy color filter 124 are disposed on the first substrate 110 on which the red color filters 121 are provided. The green color filters 123 are patterned in the display area DA to be a predetermined distance from one another. The second dummy color filter 124 is provided in the non-display area NDA in a linear shape forming a closed curve to surround the display area DA. The green color filters 123 and the second dummy color filter 124 may be provided at the same time by a single process. The green color filters 123, the second dummy color filter 124, and the red color filters 121 may have the same thickness.

Figure 5:
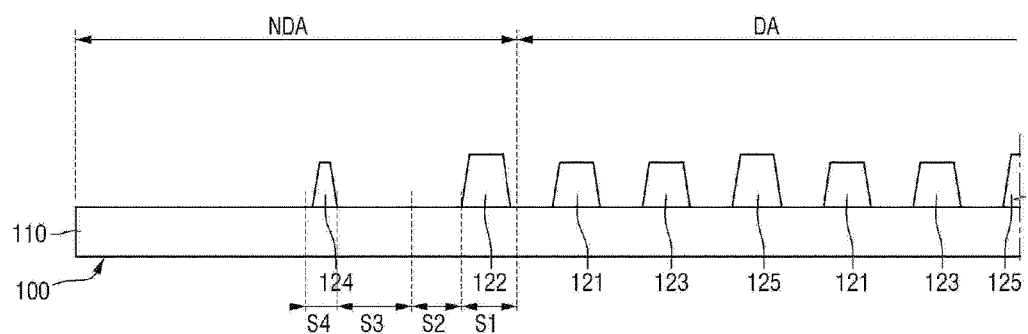

Referring to FIG. 5, blue color filters 125 and a first dummy color filter 122 are disposed on the first substrate 110 on which the red color filters 121, the green color filters 123, and the second dummy color filter 124 are provided. The blue color filters 125 are patterned in the display area DA to be a predetermined distance from one another. The first dummy color filter 122 is provided in the non-display area NDA in a linear shape forming a closed curve to surround the display area DA. The blue color filters 125 and the first dummy color filter 122 may be provided at the same time by a single process. The blue color filters 125 and the first dummy color filter 122 may have the same thickness, but may both be thicker than the red color filters 121, the green color filters 123, and the second dummy color filter 124.

FIGS. 3 through 5 illustrate an example in which the red color filters 121, the green color filters 123, the second dummy color filter 124, and the blue color filters 125 and the first dummy color filter 122 are sequentially provided, but the order in which the color filters 121, 123, and 125 and the dummy color filters 122 and 124 are provided may vary.

Figure 6:
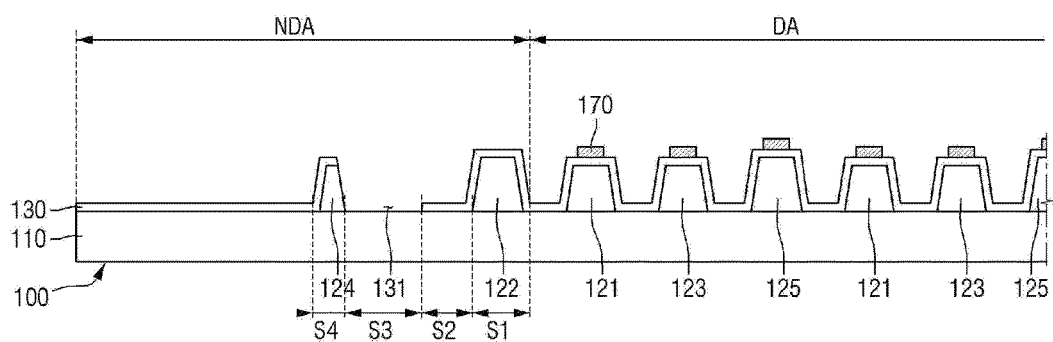

Referring to FIG. 6, an interlayer dielectric layer 130 in which an opening 131 is defined is disposed on the first substrate 110 on which the color filters 121, 123, and 125 and the dummy color filters 122 and 124 are disposed. In an exemplary embodiment, the interlayer dielectric layer 130 in which the opening 131 is defined may be provided by depositing an interlayer insulating material on the entire surface of the first substrate 110 and patterning the interlayer insulating material to partially expose the space between the first dummy color filter 122 and the second dummy color filter 124. The opening 131 does not expose the first dummy color filter 122, which is disposed on a relatively inner side, but may partially expose the second dummy color filter 124, which is disposed on a relatively outer side. The interlayer dielectric layer 130 may extend from the display area DA to the non-display area NDA to completely cover the first dummy color filter 122 and may extend further toward the second dummy color filter 124, but may not be disposed at a location on the first substrate 110 between the first dummy color filter 122 and the second dummy color filter 124 before reaching the second dummy color filter 124. The expression "the interlayer dielectric layer 130 stopping extending at a particular location", as used herein, means that the sidewall of the interlayer dielectric layer 130 is located at the particular location.

The interlayer dielectric layer 130 in which the opening 131 is defined may be provided by coating an organic material including a photosensitive material and subjecting the organic material to an exposure process. In an alternative exemplary embodiment, the interlayer dielectric layer 130 in which the opening 131 is defined may be provided by depositing an inorganic material and subjecting the inorganic material to a photolithography process. In response to the interlayer dielectric layer 130 being provided, a plurality of first through fourth sections S1 through S4 having different combinations of the dummy color filters 122 and 124 and the interlayer dielectric layer 130 stacked therein and thus having different heights are defined between the first dummy color filter 122 and the second dummy color filter 124.

Figure 7:
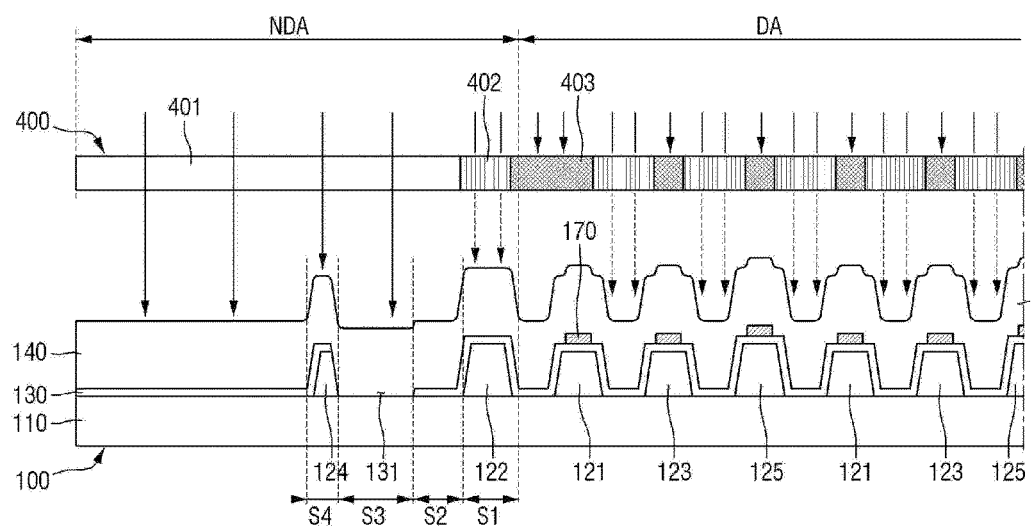

Thereafter, referring to FIG. 7, a light-shielding member 140 is disposed on the interlayer dielectric layer 130. The light-shielding member 140, which has different thicknesses in the display area DA and the non-display area NDA, may be formed by a single mask process.

More specifically, a light-shielding material including a negative photosensitive material is applied on the entire surface of the first substrate 110 to a uniform thickness. Thereafter, a photomask 400 is disposed over the light-shielding material. The photomask 400 includes a light-shielding area 403, a first light-transmitting area 401, and a second light-transmitting area 402. The light-shielding area 403 is an area that does not transmit light therethrough, the first light-transmitting area 401 is an area that transmits light therethrough in a full tone, and the second light-transmitting area 402 is an area that transmits light therethrough in a halftone. The second light-transmitting area 402 may be implemented as a halftone area or may be realized by slits.

The first light-transmitting area 401 corresponds to the entire non-display area NDA except for the first section S1. The second light-transmitting area 402 corresponds to the gaps between the color filters 121, 123, and 125 of the display area DA and the first section S1 of the non-display area NDA. The light-shielding area 403 corresponds to the color filters 121, 123, and 125 of the display area DA.

Thereafter, once the light-shielding material is subjected to exposure and development processes using the photomask 400, the light-shielding material is completely removed from the light-shielding area 403 to expose the color filters 121, 123, and 125 therebelow and remains in the first light-transmitting area 401 and the second light-transmitting area 402. Since the second light-transmitting area 402 is exposed to a smaller amount of light than the first light-transmitting area 401, the thickness of the light-shielding material remaining in the second light-transmitting area 402 is smaller than the thickness of the light-shielding material remaining in the first light-transmitting area 401.

Figure 8:
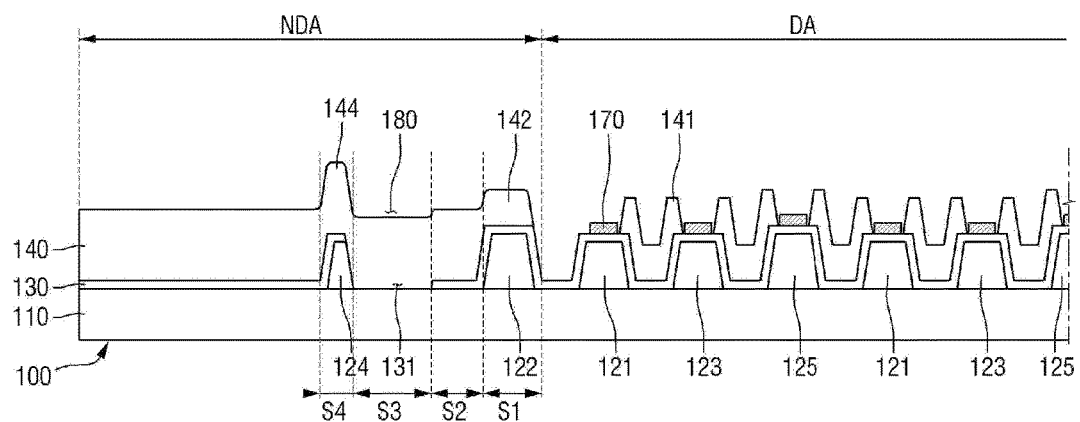

Thereafter, referring to FIG. 8, the light-shielding member 140 may define an alignment layer dam pattern 180 that surrounds the display area DA.

The exemplary embodiment has been described, taking as an example forming the light-shielding member 140 using a light-shielding material including a negative photosensitive material, but a light-shielding material including a positive photosensitive material may also be used to form the light-shielding member 140, in which case, the positions of the light-shielding area 403 and the first light-transmitting area 401 of the photomask 400 are reversed.

Figure 9:
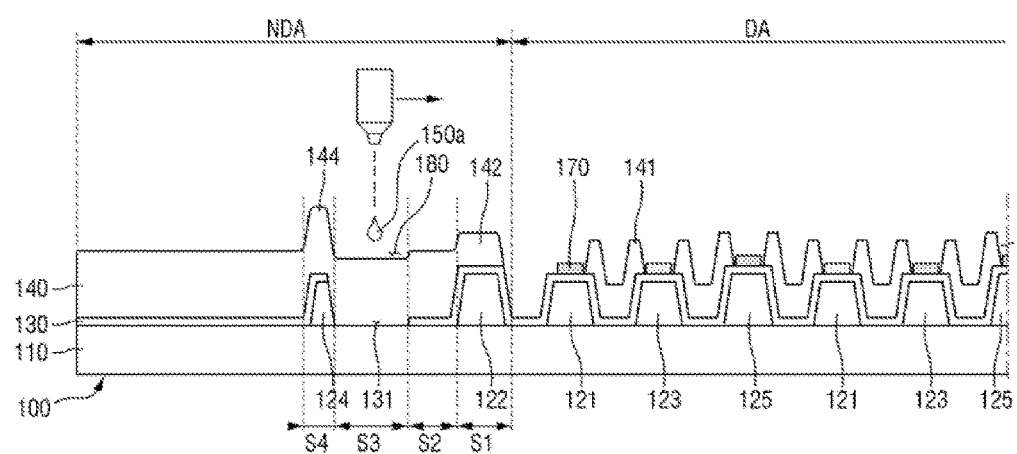

Thereafter, referring to FIG. 9, a liquid-phase alignment layer composition 150a is applied. The liquid-phase alignment layer composition 150a may be applied by inkjet printing or nozzle printing.

The alignment layer composition 150a is applied on the inside of the alignment layer dam pattern 180 and on the entire display area DA. The alignment layer dam pattern 180 stores the alignment layer composition 150a supplied thereinto. The alignment layer composition 150a may be intentionally jetted into the alignment layer dam pattern 180. In an alternative exemplary embodiment, the alignment layer composition 150a may be jetted onto the display area DA and may be allowed to spread into the alignment layer dam pattern 180 and thus to be stored in the alignment layer dam pattern 180.

As mentioned above, the height of the light-shielding member 140 in the first section S1 may be lower than the height of the light-shielding member 140 in the fourth section S4. Accordingly, even when a large amount of alignment layer composition 150a is supplied into the alignment layer dam pattern 180, the alignment layer composition 150a may spill over the first sidewall 182_1 (refer to FIG. 2) to the display area DA, but not over the third sidewall 182_3 (refer to FIG. 2) to the opposite side of the display area DA. Therefore, the alignment layer composition 150a may be prevented from spreading beyond the alignment layer dam pattern 180 to an area where a sealing member 160 is disposed.

The thickness of the alignment layer composition 150a stored in the alignment layer dam pattern 180 may be larger than the thickness of the alignment layer composition 150a applied on the display area DA, but the invention is not limited thereto.

Figure 10:
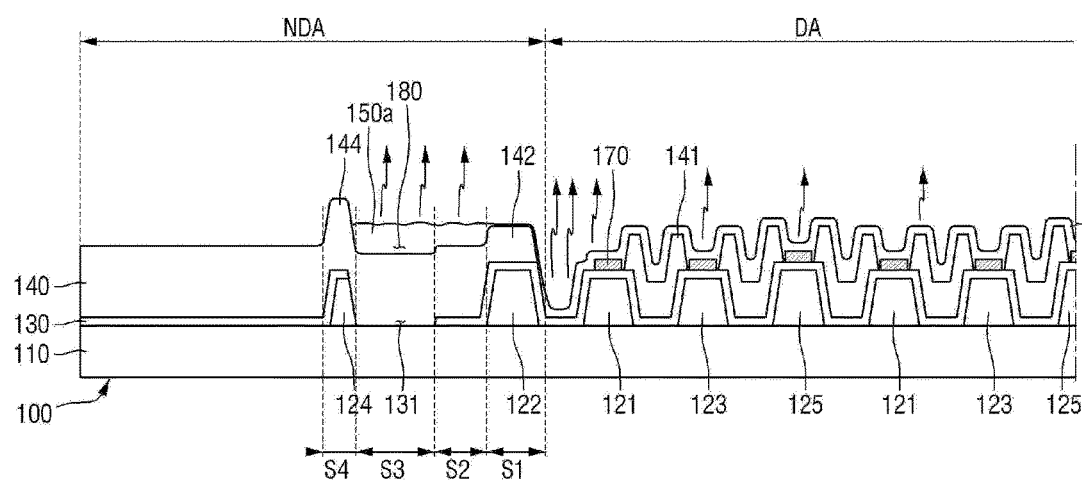

Thereafter, referring to FIG. 10, an alignment layer 150 is provided by drying the alignment layer composition 150a. The drying condition for the alignment layer composition 150a may differ from the center to the edge of the display area DA. More specifically, the alignment layer composition 150a is dried from all sides thereof at the center of the display area DA, but is dried from only one side thereof at the edge of the display area DA. Thus, the humidity is relatively lower at the edge of the display area DA than at the center of the display area DA, and as a result, the alignment layer composition 150a is dried faster at the edge of the display area DA than at the center of the display area DA. Accordingly, the thickness of the alignment layer 150 may become irregular at the edge and the center of the display area DA, and as a result, it may become difficult to precisely control liquid crystal molecules 301 (refer to FIG. 2).

In the exemplary embodiment, the alignment layer dam pattern 180 is disposed adjacent to the edge of the display area DA, and the alignment layer composition 150a is stored in the alignment layer dam pattern 180. Thus, the alignment layer composition 150a is dried from all sides thereof even at the edge of the display area DA, and as a result, almost the same drying condition for the alignment layer composition 150a as at the center of the display area DA may be established at the edge of the display area DA. Accordingly, the thickness of the alignment layer 150 may become uniform throughout the display area DA.

The alignment layer composition 150a in the alignment layer dam pattern 180 is dried and remains. The shape of the alignment layer 150 provided in the alignment layer dam pattern 180 has already been described above, and thus, a detailed description thereof will be omitted.

Thereafter, a second display panel 200 is provided, the sealing member 160 is provided in the non-display area NDA of the first substrate 110, a liquid crystal layer 300 is applied on the first substrate 110, and the second display panel 200 is bonded onto the first substrate 110, thereby obtaining the LCD device 1000 of FIG. 2. These processes are already well known in the art to which the invention pertains, and thus, detailed descriptions thereof will be omitted.

An LCD device according to another exemplary embodiment of the invention will hereinafter be described.

Figure 11:
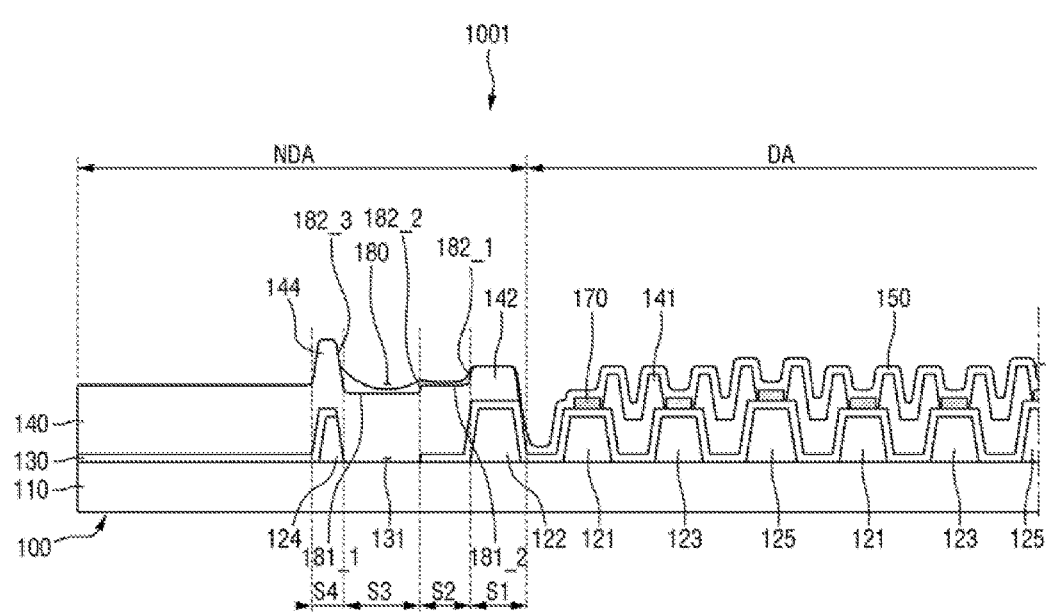
FIG. 11 is a cross-sectional view of another exemplary embodiment of an LCD device according to the invention.

FIG. 11 is a cross-sectional view of an LCD device according to another exemplary embodiment of the invention.

Referring to FIG. 11, an LCD device 1001 differs from the LCD device 1000 of FIG. 2 in that it further includes a third dummy color filter 126, which is disposed between a second dummy color filter 124 and a sealing member 160.

More specifically, the third dummy color filter 126 may be disposed between the second dummy color filter 124 and the sealing member 160. The third dummy color filter 126 may be disposed along the circumference of the second dummy color filter 124 to surround the second dummy color filter 124. The third dummy color filter 126, like a first dummy color filter 122 and the second dummy color filter 124, may have a linear shape forming a closed curve. The third dummy color filter 126 may be provided simultaneously with red color filters 121 or green color filters 123, which are disposed in a display area DA. Thus, the third dummy color filter 126 may include a photosensitive organic material comprising a pigment of the same color as, or a different color from, the first dummy color filter 122 and the second dummy color filter 124. In an exemplary embodiment, the first dummy color filter 122 may include the same material as that of the blue color filters 125, the second dummy color filter 124 may include the same material as that of the red color filters 121, and the third dummy color filter 126 may include the same material as that of the green color filters 123. Accordingly, as mentioned above, in a case in which the blue color filters 125 are thicker than the red color filters 121 or the green color filters 123, the first dummy color filter 122 may be thicker than the second dummy color filter 124 and the third dummy color filter 126 over a first substrate 110. However, the invention is not limited thereto. That is, the combination of the colors of the first dummy color filter 122, the second dummy color filter 124, and the third dummy color filter 126 is not particularly limited.

In an exemplary embodiment, the first dummy color filter 122 and the third dummy color filter 126 have different widths, and the second dummy color filter 124 and the third dummy color filter 126 may have the same width. More specifically, the first dummy color filter 122 may have a larger width than the second dummy color filter 124 and the third dummy color filter 126. However, the invention is not limited thereto. That is, the widths of the first dummy color filter 122, the second dummy color filter 124, and the third dummy color filter 126 are not particularly limited.

An interlayer dielectric layer 130 is disposed on the third dummy color filter 126. The interlayer dielectric layer 130 may extend from the top of the second dummy color filter 124. That is, as illustrated in FIG. 11, the interlayer dielectric layer 130 may begin to extend from the top surface of the second dummy color filter 124 to cover the outer sidewall of the second dummy color filter 124, may extend further toward the third dummy color filter 126 to completely cover the third dummy color filter 126, and may continue to extend toward the outer side of the non-display area NDA.

Due to the aforementioned structure of the LCD device 1001, a plurality of first through sixth sections S1 through S6 having different combinations of the second dummy color filter 124, the third dummy color filter 126, and the interlayer dielectric layer 130 stacked therein and thus having different heights are defined.

More specifically, the fifth section S5 in which the interlayer dielectric layer 130 is stacked on the first substrate 110 is defined between the second dummy color filter 124 and the third dummy color filter 126. The surface height of the fifth section S5 may be the same as the surface height of the second section S2.

A section in which the third dummy color filter 126 and the interlayer dielectric layer 130 are stacked on the first substrate 110 is defined as the sixth section S6, and in a case in which the thickness of the second dummy color filter 214, which is disposed on the first substrate 110, is the same as the thickness of the third dummy color filter 126, which is also disposed on the first substrate 110, as in the previous exemplary embodiment, the surface height of the sixth section S6 may be the same as the surface height of the fourth section S4.

That is, the first section S1, the second section S2, the third section S3, the fourth section S4, the fifth section S5, and the sixth section S6 may be disposed on the non-display area NDA of the first substrate 110 along an outward direction from the first substrate 110. In response to a light-shielding member 140 being conformally provided along the shape of the surface of the underlying structure, a first alignment layer dam pattern 180_1 whose surface height changes from a first height h1 to a second height h2 to a third height h3 to a fourth height h4 along a direction from the first dummy color filter 122 to the third dummy color filter 126 and a second alignment layer dam pattern 180_2 whose surface height changes from the fourth height h4 to the second height h2 to the fourth height h4 may be sequentially defined in the light-shielding member 140 along a direction from the first dummy color filter 122 to the third dummy color filter 126. The second alignment layer dam pattern 180_2 may be defined between an outer side 182_4 of the light-shielding member 144 and an inner side 182_5 of the light-shielding member 146. The third bottom surface 181_3 may be a top surface of the light-shielding member 140 in the fifth section S5.

An alignment layer dam pattern 180 including the first alignment layer dam pattern 180_1 and the second alignment layer dam pattern 180_2 has small step-type height differences on an inner side of the LCD device 1001 and large dam-type height differences on an outer side of the LCD device 1001.

Accordingly, even when a large amount of alignment layer composition 150a is stored between the first section S1 in which the first dummy color filter 122 is disposed and the fourth section S4 in which the second dummy color filter 124 is disposed and spills over to the fourth section S4 in which the second dummy color filter 124 is disposed, the alignment layer composition 150a may be completely blocked from spilling over to the sealing member 160 due to the presence of the sixth section S6 in which the third dummy color filter 126 is disposed.

An LCD device according to another exemplary embodiment of the invention will hereinafter be described.

Figure 12:
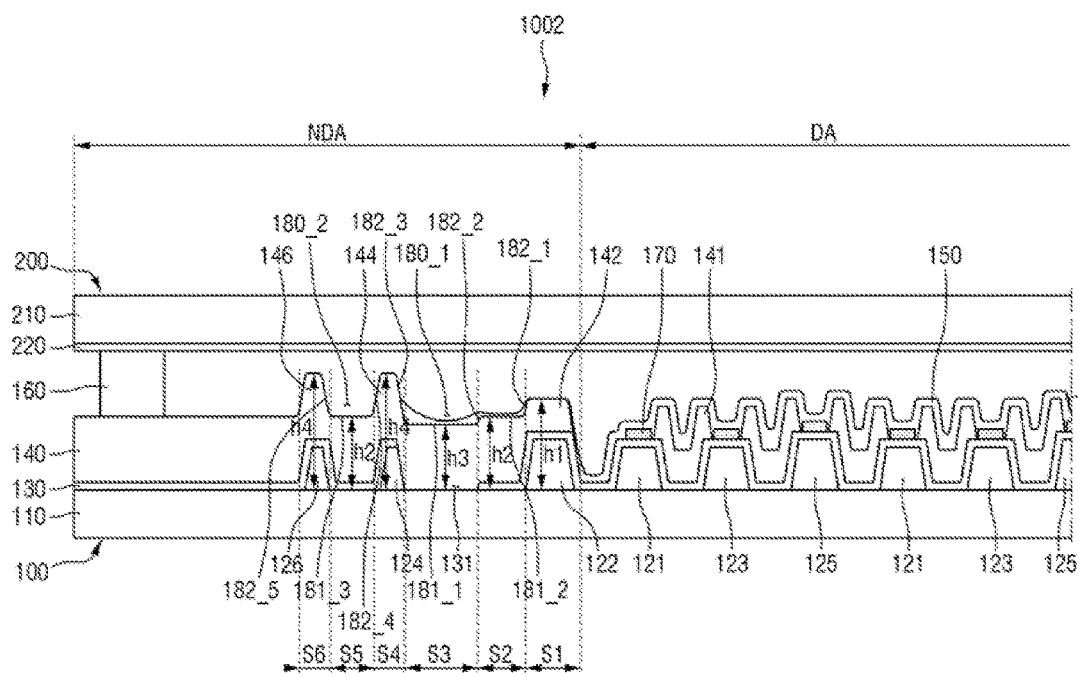
FIG. 12 is a cross-sectional view of another exemplary embodiment of an LCD device according to the invention.

FIG. 12 is a cross-sectional view of an LCD device according to another exemplary embodiment of the invention.

Referring to FIG. 12, an LCD device 1002 differs from the LCD device 1000 of FIG. 2 in that it further includes a third dummy color filter 126 and an opening 133 is defined between a second dummy color filter 124 and a sealing member 160.

The third dummy color filter 126 has already been described, and thus, a detailed description thereof will be omitted.

As illustrated in FIG. 12, an interlayer dielectric layer 130 may begin to extend from the top surface of the second dummy color filter 124 and may stop extending after covering the outer sidewall of the second dummy color filter 124. Then, the interlayer dielectric layer 130 may resume extending from the top surface of the third dummy color filter 126 and may continue to extend toward the outer side of the non-display area NDA.

Due to the aforementioned structure of the LCD device 1002, a plurality of first, second, third, fourth, fifth, and sixth sections S1, S2, S3, S4, S5', and S6' having different combinations of the second dummy color filter 124, the third dummy color filter 126, and the interlayer dielectric layer 130 and thus having different heights are defined.

More specifically, the fifth section S5' in which the interlayer dielectric layer 130 is not stacked on a first substrate 110 is defined between the second dummy color filter 124 and the third dummy color filter 126. The surface height of the fifth section S5' may be the same as the surface height of the third section S3.

A section in which the third dummy color filter 126 and the interlayer dielectric layer 130 are stacked on the first substrate 110 is defined as the sixth section S6', and in a case in which the thickness of the second dummy color filter 214, which is disposed on the first substrate 110, is the same as the thickness of the third dummy color filter 126, which is also disposed on the first substrate 110, as in the previous exemplary embodiments, the surface height of the sixth section S6' may be the same as the surface height of the fourth section S4.

That is, the first section S1, the second section S2, the third section S3, the fourth section S4, the fifth section S5', and the sixth section S6' are disposed on the non-display area NDA of the first substrate 110 in an outward direction from the first substrate 110.

In response to a light-shielding member 140 being conformally provided along the shape of the surface of the underlying structure, a first alignment layer dam pattern 180_1 whose surface height changes from a first height h1 to a second height h2 to a third height h3 to a fourth height h4 along a direction from the first dummy color filter 122 to the third dummy color filter 126 and a second alignment layer dam pattern 180_2' whose surface height changes from the third height h3 to the fourth height h4 may be sequentially defined in the light-shielding member 140 along a direction from the first dummy color filter 122 to the third dummy color filter 126.

An alignment layer dam pattern 180 including the first alignment layer dam pattern 180_1 and the second alignment layer dam pattern 180_2' has small step-type height differences on an inner side of the LCD device 1002 and large dam-type height differences on an outer side of the LCD device 1002. A fourth bottom surface 181_4 having the third height h3 may be provided between the large dam-type height differences on the outer side of the LCD device 1002.

Accordingly, even when a large amount of alignment layer composition 150a (refer to FIG. 10) is stored between the first section S1 in which the first dummy color filter 122 is disposed and the fourth section S4 in which the second dummy color filter 124 is disposed and spills over to the fourth section S4 in which the second dummy color filter 124 is disposed, the alignment layer composition 150a may be stored in the fifth section S5' in which the fourth bottom surface 181_4 is provided. Also, the alignment layer composition 150a may be completely blocked from spilling over to the sealing member 160 due to the presence of the sixth section S6' in which the third dummy color filter 126 is disposed.

In concluding the detailed description, those skilled in the art will appreciate that many variations and modifications can be made to the preferred embodiments without substantially departing from the principles of the invention. Therefore, the disclosed preferred embodiments of the invention are used in a generic and descriptive sense only and not for purposes of limitation.

What is claimed is:

1. A liquid crystal display device, comprising:
   a first substrate including a display area in which a plurality of pixels is disposed and a non-display area which surrounds the display area; and
   a light-shielding member disposed on the first substrate, the light-shielding member disposed on boundaries between the plurality of pixels and on an entirety of the non-display area and defining an alignment layer dam pattern, which is a recess, in the non-display area,
   wherein the alignment layer dam pattern surrounds the display area and has step-type height differences on a side of the display area, and
   wherein a surface height of the light-shielding member which defines the alignment layer dam pattern changes from a first height to a second height, which is lower than the first height, to a third height, which is lower than the second height, to a fourth height, which is higher than the first height, in an outward direction from the display area.

2. The liquid crystal display device of claim 1, further comprising:
   an alignment layer disposed on an entirety of the display area and on the alignment layer dam pattern in the non-display area,
   wherein the alignment layer has a uniform thickness throughout the entirety of the display area.

3. The liquid crystal display device of claim 1, wherein the alignment layer dam pattern has dam-type height differences, which are larger than the step-type height differences on the side of the display area, on an outer side of the non-display area.

4. The liquid crystal display device of claim 1, further comprising:
   a second substrate spaced apart from the first substrate and facing the first substrate; and
   a sealing member disposed in the non-display area, the sealing member interposed between the first substrate and the second substrate to bond the first substrate and the second substrate together,
   wherein the alignment layer dam pattern is disposed on an inner side of the sealing member.

5. The liquid crystal display device of claim 1, further comprising:
   a plurality of color filters disposed between the first substrate and the light-shielding member and provided for the plurality of pixels, respectively, and a plurality of dummy color filters disposed in the non-display area,
   wherein the alignment layer dam pattern is defined by a shape of a surface of the light-shielding member on the plurality of dummy color filters.

6. The liquid crystal display device of claim 5, wherein:
   the plurality of color filters includes first, second, and third color filters, which are alternately disposed on the display area and display different colors;
   a thickness of the third color filter is larger than thicknesses of the first and second color filters;

the plurality of dummy color filters includes a first dummy color filter, which is disposed adjacent to the display area and a second dummy color filter, which is disposed on an outer side of the first dummy color filter and is spaced apart from the first dummy color filter;

the first dummy color filter includes the same material as that of the third color filter; and the second dummy color filter includes the same material as that of one of the first and second color filters.

7. The liquid crystal display device of claim 6, wherein:

the plurality of dummy color filters further includes a third dummy color filter, which is disposed on an outer side of the second dummy color filter and is spaced apart from the second dummy color filter; and the third dummy color filter includes the same material as that of one of the first, second, and third color filters.

8. The liquid crystal display device of claim 5, further comprising:

an interlayer dielectric layer disposed between the light-shielding member and the plurality of color filters and between the light-shielding member and the plurality of dummy color filters, wherein the interlayer dielectric layer covers the display area and the non-display area and an opening, which partially exposes a space between the plurality of dummy color filters, is defined in the interlayer dielectric layer.

9. The liquid crystal display device of claim 8, wherein:

an area in which the alignment layer dam pattern is defined includes a plurality of sections having different heights;

the plurality of sections includes a first section in which the first dummy color filter is stacked on the first substrate, the interlayer dielectric layer is stacked on the first dummy color filter, and the light-shielding member is stacked on the interlayer dielectric layer, a second section in which the interlayer dielectric layer is stacked on the first substrate and the light-shielding member is stacked on the interlayer dielectric layer, a third section in which the light-shielding member is stacked directly on the first substrate, and a fourth section in which the second dummy color filter is stacked on the first substrate, the interlayer dielectric layer is stacked on the second dummy color filter, and the light-shielding member is stacked on the interlayer dielectric layer; and the first, second, third, and fourth sections are disposed adjacent to one another or in series along an outward direction from the first substrate.

10. The liquid crystal display device of claim 9, wherein a thickness of the light-shielding member in the first section is less than thicknesses of the light-shielding members in the second through fourth sections, respectively.

11. A liquid crystal display device, comprising:

a first substrate including a display area in which a plurality of pixels is disposed and a non-display area which surrounds the display area;

a plurality of color filters disposed on the first substrate in the display area and provided for the plurality of pixels, respectively;

first and second dummy color filters disposed on the non-display area of the first substrate;

an interlayer dielectric layer which is disposed on the plurality of color filters and the first and second dummy color filters on the first substrate and in which a first opening, which partially exposes a space between the first and second dummy color filters, is defined; and a light-shielding member disposed on the interlayer dielectric layer, on boundaries between the plurality of pixels, and on an entirety of the non-display area, wherein a surface height of the light-shielding member on and around a boundary between the display area and the non-display area changes from a first height to a second height, which is lower than the first height, to a third height, which is lower than the second height, to a fourth height, which is higher than the first height, in an outward direction from the display area.

12. The liquid crystal display device of claim 11, further comprising:

a third dummy color filter disposed on an outer side of the second dummy color filter and spaced apart from the second dummy color filter, wherein a second opening, which exposes a space between the second and third dummy color filters, is defined in the interlayer dielectric layer.

13. The liquid crystal display device of claim 11, wherein:

the non-display area includes a plurality of sections, which have different heights and are disposed along the outward direction from the display area;

the plurality of sections includes a first section in which the first dummy color filter is stacked on the first substrate, the interlayer dielectric layer is stacked on the first dummy color filter, and the light-shielding member is stacked on the interlayer dielectric layer, a second section in which the interlayer dielectric layer is stacked on the first substrate and the light-shielding member is stacked on the interlayer dielectric layer, a third section in which the light-shielding member is stacked directly on the first substrate, and a fourth section in which the second dummy color filter is stacked on the first substrate, the interlayer dielectric layer is stacked on the second dummy color filter, and the light-shielding member is stacked on the interlayer dielectric layer; and the first, second, third, and fourth sections are disposed adjacent to one another or in series along the outward direction from the display area.

14. The liquid crystal display device of claim 13, wherein:

the light-shielding member has a second thickness on the boundaries between the plurality of color filters in the display area and in the first section of the non-display area and has a first thickness, which is larger than the second thickness, on the entirety of the non-display area except for the first section; and a height from the surface of the light-shielding member from the first substrate is the first height in the first section and is a fourth height in the fourth section, the fourth height higher than the first height.

15. The liquid crystal display device of claim 13, further comprising:

an alignment layer disposed on an entirety of the display area and on the first through fourth sections of the non-display area, wherein the alignment layer has a uniform thickness throughout the entirety of the display area.

* * * * *